(12) United States Patent
Plevel et al.

(10) Patent No.: US 9,166,839 B2
(45) Date of Patent: Oct. 20, 2015

(54) SYSTEMS AND METHODS FOR REDUCING EFFECTS OF LOCAL OSCILLATOR LEAKAGE

(71) Applicant: Aviat U.S., Inc., Santa Clara, CA (US)

(72) Inventors: Sreco Plevel, Domzale (SI); Samo Vehovc, Domzale (SI)

(73) Assignee: Aviat U.S., Inc., Santa Clara, CA (US)

( * ) Notice: Subject to any disclaimer, the term of this patent is extended or adjusted under 35 U.S.C. 154(b) by 0 days.

(21) Appl. No.: 14/179,477

(22) Filed: Feb. 12, 2014

(65) Prior Publication Data

US 2014/0226738 A1  Aug. 14, 2014

Related U.S. Application Data

(60) Provisional application No. 61/764,499, filed on Feb. 13, 2013.

(51) Int. Cl.
| | |
|---|---|
| *H04L 5/12* | (2006.01) |
| *H04L 25/06* | (2006.01) |
| *H04L 25/02* | (2006.01) |
| *H04L 27/34* | (2006.01) |
| *H04L 25/03* | (2006.01) |

(52) U.S. Cl.
CPC ............ *H04L 25/063* (2013.01); *H04L 25/022* (2013.01); *H04L 25/0204* (2013.01); *H04L 25/03159* (2013.01); *H04L 25/061* (2013.01); *H04L 27/34* (2013.01); *H04L 2025/03414* (2013.01); *H04L 2025/03605* (2013.01)

(58) Field of Classification Search
CPC ... H04L 25/063; H04L 27/34; H04L 25/0204; H04L 25/061; H04L 25/022; H04L 25/03159; H04L 2025/03414; H04L 2025/03605

USPC ................................................... 375/260, 261
See application file for complete search history.

(56) References Cited

U.S. PATENT DOCUMENTS

| 6,850,556 B2 | 2/2005 | Kaewell |
| 2007/0211786 A1 | 9/2007 | Shattil |

(Continued)

FOREIGN PATENT DOCUMENTS

| EP | 2482482 | 8/2012 |
| WO | 2012171944 | 12/2012 |

OTHER PUBLICATIONS

International Application No. PCT/US2014/016220, International Search Report and Written Opinion mailed Jun. 3, 2014.

*Primary Examiner* — Dhaval Patel
(74) *Attorney, Agent, or Firm* — Sheppard, Mullin, Richter & Hampton LLP

(57) ABSTRACT

According to some embodiments, a receiving device: receives a radio frequency (RF) signal from a transmitting device over a wireless channel; performs a channel estimation of the wireless channel based on the RF signal; obtains a direct current (DC) bin measurement based on the channel estimation; determines a direct current (DC) offset correction based on the DC bin measurement; and sending the DC offset correction to the transmitting device via a local transmitter. The transmitting device: receives the DC offset correction information from the receiving device over a first wireless channel; receives data to be transmitted to the receiving device, where the DC offset correction information describing the DC offset correction; applies the DC offset correction to a transient signal that is based on the data; converts the transient signal to an RF signal; and transmits the RF signal to the receiving device over a second wireless channel.

26 Claims, 13 Drawing Sheets

(56) References Cited

U.S. PATENT DOCUMENTS

2009/0131065 A1* 5/2009 Khandekar et al. ........ 455/452.1
2009/0268798 A1* 10/2009 McNamara .................. 375/226
2010/0039158 A1* 2/2010 Ohba et al. .................... 327/307
2012/0112956 A1* 5/2012 Trotta et al. ................... 342/165
2013/0162401 A1* 6/2013 Bae et al. ..................... 340/10.1

* cited by examiner

SYSTEMS AND METHODS FOR REDUCING EFFECTS OF LOCAL OSCILLATOR LEAKAGE

CROSS-REFERENCE TO RELATED APPLICATIONS

The present application claims the benefit of U.S. Provisional Patent Application Ser. No. 61/764,499, filed Feb. 13, 2013 and entitled "Remote Direct Conversion Transmitter LO Leakage Cancellation Based on Frequency Domain RX DC Offset Measurement in SC FDE System," which is incorporated by reference herein.

BACKGROUND

1. Field of the Invention(s)

The present invention(s) relate to local oscillator leakage, and more particularly, to cancelling local oscillator leakage at a transmitter by way of information provided by a receiver.

2. Description of Related Art

Single carrier frequency domain equalization (SC-FDE) is one of many approaches used for facilitating wireless communication. An advantage of SC-FDE over single carrier systems is computational efficiency of channel equalization since equalization is performed in frequency domain. In the frequency domain, channel equalization is a product of frequency transforms of a signal and an inverse of channel estimation, while in single carrier systems, channel equalization is a convolution of a signal and equalizer impulse response. An advantage of a SC-FDE over multi-carrier systems is lower peak to average power ratio (PAPR). SC-FDE systems operate in frames, with each frame starting with a preamble used for channel estimation and with each preamble being followed by data blocks (or blocks).

A disadvantage of SC-FDE systems is that signals are sent, received, and processed in blocks, rather than in samples. Block processing limits Fast Fourier Transform (FFT) and Inverse Fast Fourier Transform (IFFT) algorithms, and often causes delays among components of a communications receiver. Additionally, certain algorithms of a communications receiver still require sample-based processing and must be performed in the time domain, such as carrier recovery using a carrier phase-lock loop (PLL). Carrier recovery PLL is required for correcting carrier frequency offset, correcting phase offset, and filtering out carrier phase noise. Since a carrier recovery PLL is positioned after frequency-domain processing in SC-FDE systems (e.g., after FFT, channel estimation, equalization, and DC offset measurement), frequency-domain algorithms in such systems are affected by the carrier frequency and phase rotation. In addition, since blocks in SC-FDE systems are separated by a cyclic prefix (CP) when transmitted over the air-link, the CP removal in the communications receiver causes discrete jumps in carrier phase from block to block, prior to carrier recovery.

A disadvantage of direct conversion transceiver architectures is the local oscillator (LO) leakage generated in a transmitting device's IQ modulator due to the modulator imperfections. This LO leakage is converted on the receiving device as a direct current (DC) offset signal in I and Q baseband signals. The DC offset signal affects the received quadrature amplitude modulation (QAM) symbol constellation by shifting the constellation away from the Gaussian plane origin and, hence, limiting the signal-to-noise ratio (SNR) of the signal received by the receiving device. The situation is exacerbated by carrier frequency offset and phase noise impairments in the signal received, which can change the DC offset signal into a jittery low-frequency signal that usually cannot be removed by the receiving device.

SUMMARY OF EMBODIMENTS

Various embodiments described herein provide systems, methods, and apparatuses relating local oscillator (LO) leakage and, more particularly, LO leakage at a transmitting device that is sending a radio frequency (RF) signal to a receiving device over a wireless channel, such as one utilized in microwave communications. As described herein, LO leakage at the transmitting device can be converted on the receiving device as a direct current (DC) offset signal in I and Q baseband signals. In some embodiments, signal impairments at the receiving device, which may be caused by LO leakage at the transmitting device, can be completely or substantially eliminated by: the receiving device providing the transmitting device with information regarding DC offset correction; and the transmitting device applying the DC offset correction to an outbound signal intended for the receiving device (e.g., transient signals, such as I and Q signals, used to generate an RF signal at the transmitting device). Some embodiments described herein relate to a wireless communication that utilizes a single carrier frequency domain equalization (SC-FDE) system at the transmitting device and receiving device.

According to some embodiments, a system, method, or apparatus is provided, where the system, method, or apparatus receives a radio frequency (RF) signal from a transmitting device over a wireless channel, performs a channel estimation of the wireless channel based on the RF signal, obtains a direct current (DC) bin measurement based on the channel estimation, and determines a direct current (DC) offset correction based on the DC bin measurement. Eventually, the DC offset correction may be sent to the transmitting device, which may be sent over the wireless channel on which the RF signal was received from the transmitting device. The DC offset may comprise an angular offset or an amplitude offset. The determining the DC offset correction can comprise determining a direct current (DC) offset based on the DC bin measurement. For example, the DC offset may be obtained from a complex value representing the DC bin measurement. For some embodiments, the system, method, or apparatus sends DC offset correction information, regarding the DC offset correction, to the transmitting device. Additionally, for some embodiments, the sending the DC offset correction information to the transmitting device may comprise including the DC offset correction information in a control channel of a frame to be transmitted to the transmitting device, where the DC offset correction information describes the DC offset correction. In some embodiments, the performing the channel estimation is performed in a frequency domain. In various embodiments, the channel estimation is based on a preamble included in the RF signal.

According to some embodiments, a system, method, or apparatus is provided, where the system, method, or apparatus receives direct current (DC) offset correction information from a receiving device over a first wireless channel, and receives data to be transmitted to the receiving device, where the DC offset correction information describing a direct current (DC) offset correction. In some embodiments, the system, method, or apparatus applies the DC offset correction to a transient signal that is based on the data, converts the transient signal to a radio frequency (RF) signal, and transmits the RF signal to the receiving device over a second wireless channel. Additionally, in some embodiments, the system, method, or apparatus further generates the transient signal based on the data. The data may be computer readable data received at the transmitting device (e.g., through a wired or wireless network interface) for transmission to the receiving device. The DC offset correction described in the DC offset correction information may be calculated at the receiving device based on a DC bin measurement of the RF signal as previously transmitted to the receiving device over the second wireless channel. The receiving the DC offset correction information from the receiving device over the first wireless channel may comprise receiving a frame from the receiving device, the frame having a control channel that includes the DC offset correction information.

Various embodiments described herein are implemented in association with a device that operates as a transmitting device, receiving device, or both. Additionally, in some embodiments described herein, a computer system, or a computer program product, comprises a computer readable medium having computer program code (i.e., executable instructions) executable by a processor to perform various steps and operations described herein.

BRIEF DESCRIPTION OF THE DRAWINGS

The drawings are provided for purposes of illustration only and merely depict typical or example embodiments. These drawings are provided to facilitate the reader's understanding and shall not be considered limiting of the breadth, scope, or applicability various embodiments.

Figure 1:
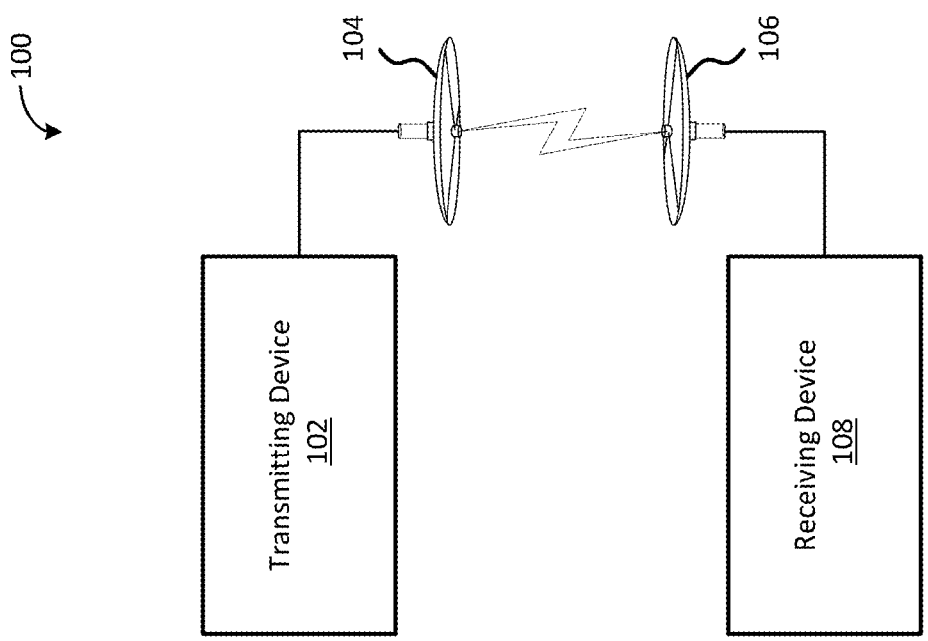
FIG. 1 depicts an example environment including a transmitting device and a receiving device communicating over a communication network in accordance with some embodiments.

The figures are not intended to be exhaustive or to limit the embodiments to the precise form disclosed. It should be understood that various embodiments may be practiced with modification and alteration.

DETAILED DESCRIPTION OF VARIOUS EMBODIMENTS

Various embodiments described herein provide systems, methods, and apparatuses relating to local oscillator (LO) leakage and, more particularly, LO leakage at a transmitting device that is sending a radio frequency (RF) signal to a receiving device over a wireless channel. As used herein, the transmitting device is capable of sending data to and receiving data from the receiving device, and the receiving device is capable of sending data to and receiving data from the receiving device. Additionally, it will be understood that data transfers between the transmitting device and the receiving device may be performed over a bi-directional wireless channel between the two devices.

Some embodiments are implemented in an SC-FDE system, or a similar system, where signals between a transmitting device and a receiving device are processed in blocks of a frame, where the blocks are transformed in the frequency domain using a Fast Fourier Transform (FFT) algorithm. In some embodiments, the direct current (DC) offset is measured at the receiving device based on the FFT of a preamble included in the frame comprising blocks. The DC offset may be determined based on a direct current (DC) bin measurement obtained from the FFT of the preamble at the receiving device. In particular, the DC offset may be obtained from a complex value representing the direct current (DC) bin measurement. For some embodiments, the preamble is configured such that it does not contain signal amplitude in the DC bin (i.e., at 0 Hz) of its frequency spectrum. As a result, in some embodiments, any signal amplitude detected by the receiving device in the DC bin of the preamble would be considered to be unwanted or undesirable DC offset. As described herein, this DC offset may be the result of local oscillator (LO) leakage present at the transmitting device that is impairing the signal being transmitted from the transmitting device to the receiving device.

For some embodiments, the width of the direct current bin is wider than the phase noise modulation of the transmission or reception carriers used by the receiving and transmitting devices. Additionally, for some embodiments, the DC offset obtained from the DC bin measurement is an average of DC bin measurements taken over a number of frames that include preambles. By obtaining the DC measurement in this way, embodiments can reduce or eliminate the effects of thermal or phase noise on the DC bin measurement.

In some embodiments, prior to frequency domain processing of a signal received from the transmitting device, the receiving device reduces or removes frequency error (e.g., frequency offset) in the signal using the averaged carrier frequency error detected by the carrier recovery loop (e.g., carrier recovery phase-lock loop). In the receiver chain of the receiving device, the carrier recovery loop may be performed after the frequency domain processing of the signal. Additionally, for some embodiments, carrier phase jumps (e.g., phase offset) from one frame preamble to another is removed using the carrier phase detected by the carrier recovery loop. In particular, the carrier phase detected by the carrier recovery loop can be provided to channel estimation process performed in the frequency domain processing portion of the receiving device. By removing or reducing carrier frequency and/or phase offsets from the blocks, the rotation of the DC offset (e.g., as determined based on the DC bin measurement) due to carrier errors is reduced or eliminated.

For some embodiments, a receiving device determines the DC offset and provides information regarding the DC offset to a transmitting device, so that the transmitting device can cancel the local oscillator (LO) leakage at the transmitting device based on the DC offset. Depending on the embodiment, the information provided to the transmitting device can include DC offset determined at the receiving device, DC offset correction that should be applied at the transmitting device (e.g., applied as DC correction biases), or both. Though in various embodiments described herein the transmitting device receives DC offset correction from the receiving device, in some embodiments, the transmitting device receives the DC offset from receiving device, determines the DC offset correction at the transmitting device, and applies the DC offset correction accordingly. By feeding back information regarding the DC offset from the receiving device to the transmitting device, the transmitting device can reduce or cancel the LO leakage occurring at the transmitting device and, consequently, reduce or cancel effects of the LO leakage downstream at the receiving device. In addition, by feeding back information regarding the DC offset from the receiving device to the transmitting device, issues caused by LO leakage at the transmitting device can be addressed at the transmitting device rather than the receiving device (where it may be more complicated to address). The feedback of information can be regarded as an adaptive loop for cancelling LO leakage at the transmitting device using DC offset measured at the receiving device.

FIG. 1 depicts an example environment including a transmitting device 102 and a receiving device 108 communicating over a communication network in accordance with some embodiments. As shown, the transmitting device 102 is coupled to an antenna 104, the receiving device 108 is coupled to an antenna 106, and the transmitting device 102 and the receiving device 108 are in communication with each other using their antennae 104/108. Those skilled in the art will appreciate that the transmitting device 102 and the receiving device 108, individually or together, may communicate with any digital device or receiver. Additionally, those skilled in the art will appreciate that for some embodiments, the components, functionality, or configuration of either the transmitting device 102 or the receiving device 108 may differ from what is described or depicted with respect to FIG. 1.

Although only the transmitting device 102 and the receiving device 108 are illustrated in FIG. 1, the transmitting device 102 and the receiving device 108 may be part of a larger network of devices that includes one or more wireless communication towers, routers, servers, bridges, hubs, other digital devices, or the like. Additionally, the transmitting device 102 and the receiving device 108 may be part of a network comprising a LAN, WAN, or any other type of network. The transmitting device 102 and the receiving device 108 may be used to implement a microwave, LTE, WiMax, 4G, 3G, or other wireless network. For example, the transmitting device 102 and the receiving device 108 may comprise radio frequency units implemented within a microwave network.

As described herein, the transmitting device 102 and the receiving device 108 may be both digital devices. A digital device is any device with a processor and memory. In some embodiments, the transmitting device 102 or the receiving device 108 may comprise a transmitter, receiver, transceiver, or the like. Examples of digital devices are further described with reference to FIG. 13. Depending on some embodiments, one or both of the transmitting device 102 and the receiving device 108 may include a split-mount transceiver, which may be configured for transmission or reception of microwave signals. The transmitting device 102 and the receiving device 108 may respectively comprise a single carrier frequency domain equalization (SC-FDE) system that facilitates wireless communication between the two devices using a single-carrier RF signal.

According to some embodiments, the transmitting device 102 transmits a radio frequency (RF) signal to the receiving device 108, and the receiving device 108 receives the RF signal from the transmitting device 102 via an over-the-air link (e.g., wireless channel) between the transmitting device 102 and the receiving device 108. Upon receiving the RF signal, the receiving device 108 may perform a channel estimation of the over-the-air links based on the RF signal, obtain a direct current (DC) bin measurement based on the channel estimation, and determine a direct current (DC) offset correction based on the DC bin measurement. For some embodiments, the channel estimation may be based on a preamble included in a data frame (hereafter, a "frame") carried by the RF signal from the transmitting device 102 to the receiving device 108 via the over-the-air link. More regarding frames is discussed herein with respect to FIG. 3. For some embodiments, a DC bin measurement obtained from the preamble is expected to have zero amplitude, and an offset from the zero amplitude would be considered the DC offset. From the DC offset, the receiving device 108 can determine a DC offset correction that can be applied at the transmitting device 102 to compensate for the DC offset detected at the receiving device 108. The receiving device 108 may transmit the DC offset correction to the transmitting device 102, and may do so over the wireless channel on which the RF signal was received by the receiving device 108 from the transmitting device 102. By providing the transmitting device 102 with the DC offset correction, the receiving device 108 can provide feedback information used to adaptively adjust DC offset correction at the transmitting device 102, thereby reducing or eliminate the effects of local oscillator (LO) leakage present at the transmitting device 102.

When sending the DC offset correction to the transmitting device 102, the receiving device 108 may do so by sending information regarding the DC offset correction (DC offset correction information) to the transmitting device 102. Additionally, the DC offset correction information sent from the receiving device 108 to the transmitting device 102 may be configured such that the transmitting device 102 can use the information to apply one or more corrective direct current (DC) biases (e.g., having bias values) to outbound signals at the transmitting device 102 (e.g., I and Q signals from which the transmitting device 102 generates the RF signal).

Sending the DC offset correction information from the receiving device 108 to the transmitting device 102 may entail including the DC offset correction information in a frame being sent from the receiving device 108 to the transmitting device 102, such as in the control channel of the frame.

As described herein, by applying corrective direct current (DC) biases at the transmitting device 102 based on DC offset correction information, the transmitting device 102 can compensate or eliminate the DC offset in signals received by the receiving device 108 from the transmitting device 102. As also described herein, such DC offset can be caused by local oscillator (LO) leakage present in the transmitting device 102 (e.g., by of its IQ modulator).

In some embodiments, the DC offset correction information comprises relative direction in which a corrective DC bias needs to be applied at the transmitting device 102. For some embodiments, the relative direction provided by the DC offset correction information causes the transmitting device 102 to apply a predetermined bias value to a signal, which will be converted to an RF signal transmitted to the receiving device 108. The signal or signals to which the bias is applied may be transient signals at the transmitting device 102, such as in-phase (I) and quadrature (Q) signals, which are eventually converted by the transmitting device 102 to a radio frequency (RF) signal and transmitted to the receiving device 108. Those skilled in the art will appreciate that there may be more than one relative direction provided in the DC offset correction information, that there may be more than one corrective DC bias applied at the transmitting device 102 based on the DC offset correction information, and that there may be more than one signal at the transmitting device 102 to which a corrective DC bias is applied.

In some embodiments, to minimize the required information needed to convey the DC offset correction (e.g., the relative directions of bias application) to the transmitting device 102, the DC offset correction information comprises three-state logic, where 2 bits of information are associated with DC offset correction for the in-phase (I) signal at the transmitting device 102 (in-phase DC offset correction) and 2 bits of information are associated with DC offset correction for the quadrature (Q) signal at the transmitting device 102 (quadrature DC offset correction). Table 1 below illustrates an example association between DC offset positions in the Gaussian plane detected at the receiving device 108, and example DC offset correction information, comprising three state logic, that can be provided to the transmitting device 102 by the receiving device 108.

TABLE 1

| Detected DC Offset in the Gaussian Plane | DC Offset Correction Information |
|---|---|
| No DC Offset | I = 0, Q = 0 |
| DC Offset in $1^{st}$ Quadrant | I = +1, Q = +1 |
| DC Offset in $2^{nd}$ Quadrant | I = −1, Q = +1 |
| DC Offset in $3^{rd}$ Quadrant | I = −1, Q = −1 |
| DC Offset in $4^{th}$ Quadrant | I = +1, Q = −1 |

In Table 1, each set of 4 bits in the DC offset correction information received by the transmitting device 102 may cause the transmitting device 102 to apply a quant of DC bias correction on the transient signal (e.g., I and Q signals) that is eventually converted and sent to the receiving device 108 as an RF signal. For example, a value of 1 in the DC offset correction information for the I or Q signal may represent quant of 100 mV of bias to be applied to I or Q signal, while a value of −1 in the DC offset correction information for the I or Q signal may represent a quant of −100 mV bias to be applied to the I or Q signal.

As described herein, the application of a quant of DC bias at the transmitting device 102 can result in a change (e.g., raising or lower) of the DC offset at the receiving device 108. The relative direction of DC bias correction provided by the DC offset correction information can enable a feedback loop between the transmitting device 102 and the receiving device 108, which can result in reduction or elimination of DC offset at the receiving device 108. Depending on the embodiment, this feedback loop will continue until DC offset at the receiving device 108 reaches zero, nears zero, or falls within an acceptable threshold (e.g., threshold of +/−1 mV DC offset). Where a DC offset threshold is utilized to enable and disable the feedback loop, the feedback loop would resume when the DC offset at the receiving device 108 exceed the threshold.

Those skilled in the art will appreciate that for a given DC offset correction value (e.g., 1 or −1), the quant of DC bias applied to the I and Q signal may differ for the signals. For instance, the quant may be applied as follows: for I=1 apply 1 mV to the I signal; for I=−1 apply −10 mV to the I signal; for Q=1 apply 100 mV to the Q signal; and for Q=−1 apply −1 mV to the Q signal. For some embodiments, no DC bias is applied for a DC offset correction value of 0. The quant of DC bias applied by the transmitting device 102 may depend on the particular properties of the components utilized by the transmitting device 102. For instance, the quant of DC bias used by the transmitting device 102 may depend on the particular IQ modulators employed by the transmitting device 102.

Depending on the embodiment, the DC offset determined by the receiving device 108 may comprise an angular offset or an amplitude offset. For some embodiments, the DC offset may be a complex value representing the DC bin measurement. In some embodiments, such as those implementing SC-FDE-based communication, the channel estimation is performed in a frequency domain, and is performed based on a preamble provided in a frame, to the receiving device 108, through an RF signal transmitted from the transmitting device 102. As described herein, the channel estimation process at the receiving device 108 can provide bin measurements of a preamble received from the transmitting device 102, including the DC bin measurement.

For some embodiments, the receiving device 108 sends the DC offset correction information to the transmitting device 102 by including the direct current (DC) offset correction information in a control channel of a frame to be transmitted to the transmitting device 102. In various embodiments, the DC offset correction information comprises a relative direction in which a corrective direct current (DC) bias should be applied to a transient signal at the transmitting device 102, where the transmitting device 102 generates the RF signal based on the transient signal. As described herein, the transient signal at the transmitting device 102 may comprise an in-phase (I) signal and a quadrature (Q) signal.

The receiving device 108 may convert an RF signal received from the transmitting device 102, over a wireless channel, to a transient signal before the receiving device 108 performs channel estimation of the wireless channel based on the transient signal. As described herein, the transient signal at the receiving device 108 may comprise an in-phase (I) signal and a quadrature (Q) signal. The receiving device 108 may use a phase offset correction (e.g., from carrier recovery) to perform channel estimation based on the transient signal (e.g., preamble provided by the transient signal). In addition, the receiving device 108 may apply a frequency offset correction (e.g., using the averaged carrier frequency error) to the transient signal before the receiving device 108 performs channel estimation based on the transient signal. In some embodiments, the phase offset correction is used to perform a channel estimation process based on a preamble. The phase offset correction may enable the channel estimation process to obtain more accurate bin measurements based on the preamble. In various embodiments, application of carrier phase and frequency offset corrections, as provided by a carrier recovery process (e.g., carrier recovery PLL), enables the receiving device 108 to de-rotate the phase of the DC offset prior to its measurement (e.g., DC bin measurement).

In various embodiments, the receiving device 108 generates phase offset correction by performing carrier recovery on the transient signal. Further, in some embodiments, the receiving device 108 generates frequency offset correction by performing carrier recovery on the transient signal. The receiving device 108 may perform minimum mean squared error (MMSE) equalization on the transient signal before performing carrier recovery on the transient signal. Depending on the embodiments, the MMSE equalization may be performed in the frequency domain, while the carrier recovery may be performed in the time domain.

According to some embodiments, the transmitting device 102 receives direct current (DC) offset correction information from the receiving device 108 over a first wireless channel, and receives data to be transmitted to the receiving device 108. As described herein, the DC offset correction information can describe a direct current (DC) offset correction, which the transmitting device 102 can apply to one or more signals to reduce or eliminate effects of local oscillator (LO) leakage at the transmitting device 102. The transmitting device 102 can generate a transient signal based on the data, apply the DC offset correction to the transient signal, convert the transient signal to a radio frequency (RF) signal, and transmit the RF signal to the receiving device 108 over a second wireless channel. As described herein, the DC offset correction described in the DC offset correction information may be calculated at the receiving device 108 based on a DC bin measurement of the RF signal as previously transmitted from the transmitting device 102 to the receiving device 108 over the second wireless channel. For some embodiments, the first and second wireless channels are the same (e.g., where the wireless channel is bi-directional).

In some embodiments, the transmitting device 102 receives the DC offset correction information in a frame from the receiving device 108, where the frame comprises a control channel that includes the DC offset correction information. Additionally, in some embodiments, the transmitting device 102 applies the DC offset correction to the transient signal by applying a corrective direct (DC) bias to the transient signal before converting the transient signal to the RF signal. For various embodiments, the DC offset correction information comprises a relative direction in which the transmitting device 102 applies corrective direct current (DC) bias to the transient signal.

Figure 2:
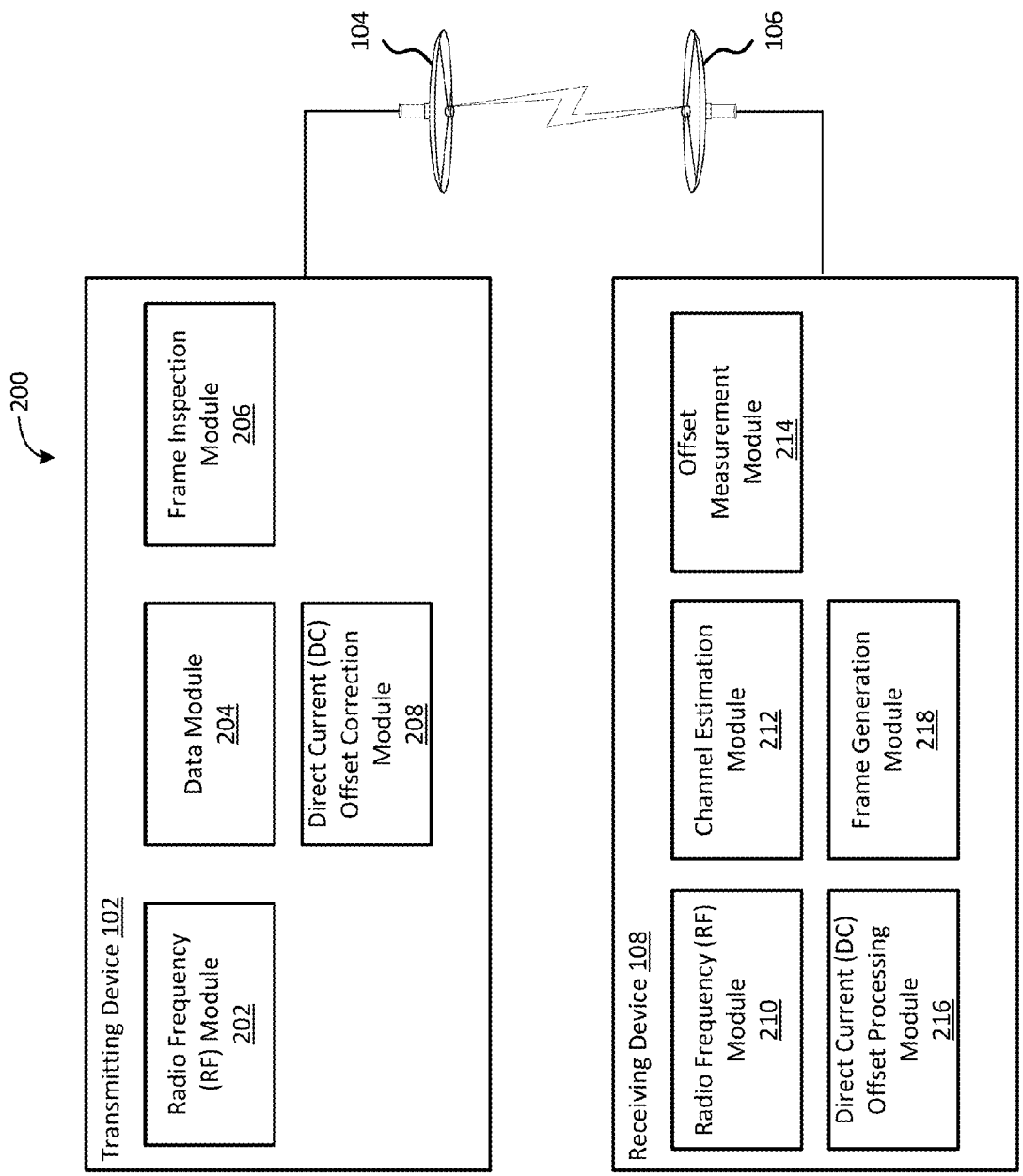
FIG. 2 depicts an example environment including a transmitting device and a receiving device communicating over a communication network in accordance with some embodiments.

FIG. 2 depicts an example environment 200 including the transmitting device 102 and the receiving device 108 communicating over a communication network in accordance with some embodiments. In FIG. 2, the transmitting device 102 comprises a radio frequency (RF) module 202, a data module 204, a frame inspection module 206, and a direct current (DC) offset correction module 208. The receiving device 108 comprises a radio frequency (RF) module 210, a channel estimation module 212, an offset measurement module 214, a direct current (DC) offset processing module 216, and a frame generation module 218. Those skilled in the art will appreciate that for some embodiments the components, functionality, or configuration of either the transmitting device 102 or the receiving device 108 may differ from what is described or depicted with respect to FIG. 2.

As used herein, the term module might describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, DPLLs, FPGAs, logical components, software routines or other mechanisms might be implemented to make up a module. In implementation, the various modules described herein might be implemented as discrete modules or the functions and features described can be shared in part or in total among one or more modules. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of some embodiments are implemented in whole or in part using software, in some embodiments, these software elements can be implemented to operate with a digital device capable of carrying out the functionality described with respect thereto.

With respect to the transmitting device 102, the RF module 202 of the transmitting device 102 may be configured to receive data from the receiving device 108 through the antenna 104, and transmit data to the receiving device 108 through the antenna 104, via a radio frequency (RF) signal carried over a wireless channel. The RF module 202 may use a component, such as an IQ modulator, that introduces local oscillator (LO) leakage into the RF signal transmitted to the receiving device 108. Additionally, through the RF module 202, the transmitting device 102 may receive information regarding the direct current (DC) offset, direct current (DC) offset correction, or both, from the receiving device 108. As described herein, such information may be utilized in applying DC offset correction at the transmitting device 102 to reduce or cancel the effects of LO leakage observed downstream from the transmitting device 102 (e.g., at the receiving device 108). For some embodiments, the RF module 202 includes a split-mount transceiver (e.g., outdoor unit [ODU] and indoor unit [IDU]), which may be configured for transmission or reception of microwave signals.

The data to be transmitted from the transmitting device 102 to the receiving device 108 may be provided by the data module 204. Additionally, the data received from the receiving device 108 may be provided to the frame inspection module 206 for extraction of information regarding the direct current (DC) offset, direct current (DC) offset correction, or both. The data sent to or received from the receiving device 108 may in the form of a frame comprising a preamble, a control channel, and one or more blocks.

The data module 204 of the transmitting device 102 may be configured to receive data and construct frames based on the data. For some embodiments, the data may be computer-readable data, such as network data, received at the transmitting device 102 for transmission to the receiving device 108 over the wireless channel. The frame may comprise a preamble, cyclic prefix, a control channel, and one or more blocks. As described herein, the frames constructed by the data module 204 may be provided to the RF module 202 for transmission to the receiving device 108. The data module 204 may enable the transmitting device 102 to send or receive data through a wired or wireless network (e.g., Internet, LAN, WAN, or WiFi) to which the transmitting device 102 is coupled. The frames generated by the data module 204 may be provided to the RF module 202 as data that is to be converted to a radio frequency (RF) signal and transmitted to the receiving device 108, as a radio frequency (RF) signal, via the antenna 104.

The frame inspection module 206 of the transmitting device 102 may be configured to receive frames from the receiving device 108 and inspect particular components of the frames. For example, the frame inspection module 206 inspects a preamble, control channel, or block included in a frame received from the receiving device 108. For some embodiments, information regarding the DC offset, the DC offset correction, or both are included in a control channel, or other components of the frame. Once information regarding the DC offset (e.g., the DC offset correction) is obtained from a frame, the frame inspection module 206 can provide the information to the DC offset correction module 208.

The DC offset correction module 208 of the transmitting device 102 may be configured to apply direct current (DC) offset correction at the transmitting device 102, and may do so based on the information regarding the DC offset or the DC offset correction received from the receiving device 108. The DC offset correction module 208 may apply DC biases to a transient signal (e.g., I or Q signals) generated by the RF module 202 as the RF module 202 converts data to a radio frequency (RF) signal to be transmitted from the transmitting device 102 to the receiving device 108.

For some embodiments, the DC offset correction information comprises relative direction in which a corrective DC bias needs to be applied at the transmitting device 102, and the DC offset correction module 208 applies a predetermined bias value to a transient signal according based on the relative direction. By applying biases in this manner, the transmitting device 102 can compensate or eliminate the DC offset in signals received by the receiving device 108 from the transmitting device 102. As described herein, DC offset observed in signals received by the receiving device 108 can be caused by local oscillator (LO) leakage present in the transmitting device 102 (e.g., by of its IQ modulator).

With respect to the receiving device 108, the RF module 210 of the receiving device 108 may be configured to receive data from the transmitting device 102 through the antenna 106, and transmit data to the transmitting device 102 through the antenna 106, via a radio frequency (RF) signal carried over a wireless channel. The data sent to or received from the receiving device 108 may be in the form of a frame comprising a preamble, a control channel, and one or more blocks. Accordingly, through the RF module 210, the receiving device 108 may receive a frame from the transmitting device 102, where the frame includes a preamble. The RF module 210 may provide the frames received from the transmitting device 102 to the channel estimation module 212, which in turn may utilize preambles in the frames to perform channel estimation on the wireless channel carrying the frames.

Through the RF module 210, the receiving device 108 may also transmit information regarding the direct current (DC) offset, direct current (DC) offset correction, or both, to the transmitting device 102. As described herein, such information may be utilized by the transmitting device 102 in applying DC offset correction, at the transmitting device 102, to reduce or cancel the effects of LO leakage observed in RF signals received by the receiving device 108 (e.g., from the transmitting device 102). For some embodiments, the RF module 210 includes a split-mount transceiver, e.g., outdoor unit (ODU) and indoor unit (IDU), which may be configured for transmission or reception of microwave signals.

The channel estimation module 212 of the receiving device 108 may be configured to perform channel estimation on a wireless channel, between the antenna 106 and the antenna 104, used to carry an RF signal from the transmitting device 102 to the receiving device 108. As described herein, the channel estimation module 212 may perform channel estimation based on the preamble. As also described herein, by performing channel estimation on the wireless channel using the preamble of one or more frames as they are received from the transmitting device 102, the channel estimation process can provide one or more bin measurements, including that of direct current (DC) bin. The provided measurement of DC bin may be represented by a complex value. The channel estimation module 212 may provide the DC bin measurement to the offset measurement module 214 for offset calculation.

The offset measurement module 214 of the receiving device 108 may be configured to perform a direct current (DC) bin measurement and determine a direct current (DC) offset based on the DC bin measurement. As described herein, for some embodiments, the receiving device 108 is anticipating a DC bin measurement of zero amplitude and any offset from zero amplitude would be considered a DC offset. In some embodiments, the offset measurement module 214 determines a DC offset comprising an angular offset for the DC offset, and an amplitude offset for the DC offset. The offset measurement module 214 may obtain the DC offset by averaging DC bin measurements taken over a number of frames that include preambles. In this way, the offset measurement module 214 can reduce or eliminate the effects of thermal or phase noise on the DC bin measurement. Once determined, the offset measurement module 214 may provide the DC offset to the direct current (DC) offset processing module 216.

The DC offset processing module 216 of the receiving device 108 may be configured to determine direct current (DC) offset corrections to be applied by the transmitting device 102 to counter the direct current (DC) offset determined at the receiving device 108 by the offset measurement module 214. For some embodiments, the DC offset processing module 216 generates information regarding one or more DC offset corrections to be applied to one or more signals at the transmitting device 102 as bias values. The information may comprise one or more direct current (DC) offset correction values that can be applied to one or more signals at the transmitting device 102 as bias values, or may comprise one or more relative directions in which a corrective DC bias (e.g., of a predetermined bias value) will be applied at the transmitting device 102. The DC offset processing module 216 may provide information regarding the DC offset corrections to the frame generation module 218 for transmission to the transmitting device 102.

The frame generation module 218 of the receiving device 108 may be configured to generate frames at the receiving device 108 for transmission to the transmitting device 102. As frames are generated, the frame generation module 218 may provide the frames to the RF module 210 for transmission to the transmitting device 102 via an RF signal over a wireless channel. To convey direct current (DC) offset correction information to the transmitting device 102, the frame generation module 218 may include the information in one or more portions (e.g., preamble, control channel, or data block) of a frame constructed for transmission to the transmitting device 102. For some embodiments, the frame generation module 218 generates a frame where the DC offset correction information is included in the control channel of the frame. The DC offset correction information may be included in the control channel as 4 bits of information, where 2 bits provide the relative direction of corrective direct current (DC) bias to be applied to the in-phase (I) signal at the transmitting device 102 (e.g., as in-phase DC offset correction), and the remaining 2 bits provide the relative direction of corrective DC bias to be applied to the quadrature (Q) signal at the transmitting device 102 (e.g., as quadrature DC offset correction).

Those skilled in the art will appreciate that the transmitting device 102 may comprise components similar to those of the receiving device 108, and vice versa. Additionally, the transmitting device 102 may include functionality that permits the transmitting device 102 to operate as a receiving device, and the receiving device 108 may include functionality that permits the receiving device 108 to operate a transmitting device.

Figure 3:
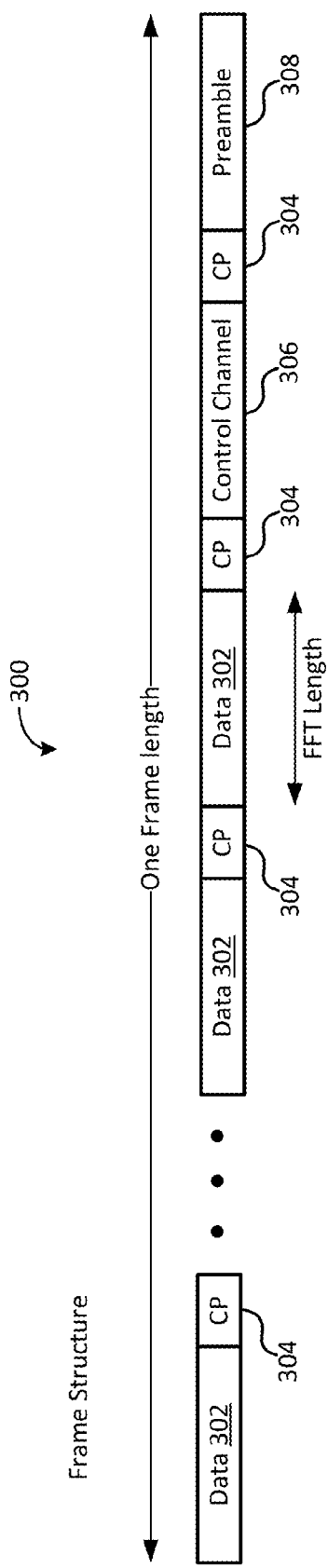
FIG. 3 is a block diagram of an example frame communicated between a transmitting device and a receiving device over a communication network in accordance with some embodiments.

FIG. 3 is a block diagram of an example frame 300 communicated between a transmitting device and a receiving device over a communication network in accordance with some embodiments. For various embodiments described herein, structure of the frame 300 is similar or identical to the structure used in communicating data between two devices over an over-the-air link (e.g., wireless channel). For example, the frame 300 is one utilized by an SC-FDE system for communication of data over an over-the-air link between two devices. In another example, the frame 300 reflects the structure of a frame transmitted from the transmitting device 102 to the receiving device 108, transmitted from the receiving device 108 to the transmitting device 102, or both, where the frame 300 is transmitted between the transmitting device 102 and the receiving device 108 over a radio frequency (RF) signal. In FIG. 3, the frame 300 illustrates a single frame length, where the frame 300 comprises data blocks 302, cyclic prefixes 304, a control channel 306, and a preamble 308. As shown in FIG. 3, the sequence of the frame 300 comprises: a series of the data blocks 302 with each of the data blocks 302 being separated by one of the cyclic prefixes 304; the control channel 306 separated from series of the data block 302 by one of the cyclic prefixes 304; and the preamble 308 separated from the control channel 306 by one of the cyclic prefixes 304. The length of one of the data blocks 302 may be such that Fast Fourier Transforms (FFTs) can be successfully performed on data blocks received or transmitted by a device described herein. Those skilled in the art will appreciate that in some embodiments, a data structure different from the one illustrated in FIG. 3 is utilized for transmission of data between communication devices described herein.

Figure 4:
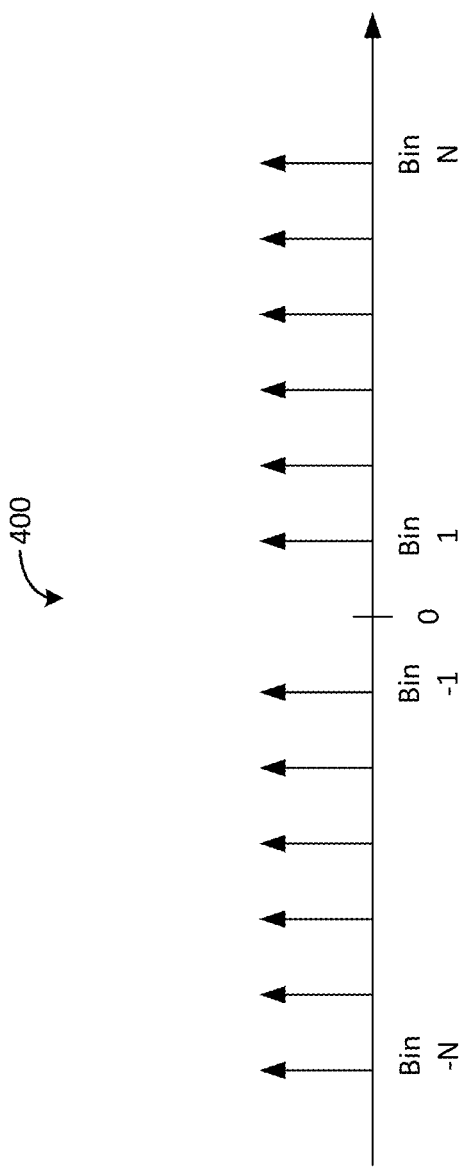
FIG. 4 is a graph illustrating an example preamble in a frequency domain in accordance with some embodiments.

FIG. 4 is a graph 400 illustrating an example preamble in a frequency domain in accordance with some embodiments. In particular, the graph 400 illustrates a plurality of lines that each represent a bin measurement obtained for an example preamble. For some embodiments, a preamble provides a sequence of carriers in the frequency domain, where a given carrier frequency has an amplitude of one and a random phase of 0 or 180 degrees. As shown in FIG. 4, for some embodiments, the bin measurement of the preamble at a carrier frequency of 0 Hz (also known as the bin 0 measurement or the direct current bin measurement) is expected to have zero amplitude. According to some embodiments, a receiving device (e.g., the receiving device 108) uses the expectation of zero amplitude for the DC bin measurement of a preamble from a transmitting device (e.g., the transmitting device 102) to determine the DC offset present in a signal from the transmitting device (e.g., by determining the DC offset from DC bin measurement), and determine a DC offset correction based on the DC offset. The receiving device can provide information regarding the DC offset correction to the transmitting device, and the transmitting device can apply a DC offset correction, at the transmitting device, by applying one or more bias to one or more signals (e.g., I and Q signals) at the transmitting device in accordance with the DC offset correction information. The DC offset correction process may comprise multiple iterations in which a signal is transmitted from the transmitting device to the receiving device, the receiving device provides DC offset correction information to the transmitting device based on the signal as transmitted, and the DC offset correction is applied at the transmitting device. For some embodiments, each iteration is intended to cause the DC bin measurement obtained at the receiving device to converge to zero amplitude.

According to some embodiments, the example preamble of FIG. 4 is similar or identical to the preamble 308 illustrated in the frame 300. For some embodiments, the example preamble of FIG. 4 is transmitted from a transmitting device to a receiving device 108, over a wireless channel, by way of a frame similar to the frame 300. As described herein, the DC bin measurement from the example preamble may be obtained by the receiving device, during channel estimation of the wireless channel.

Figure 5:
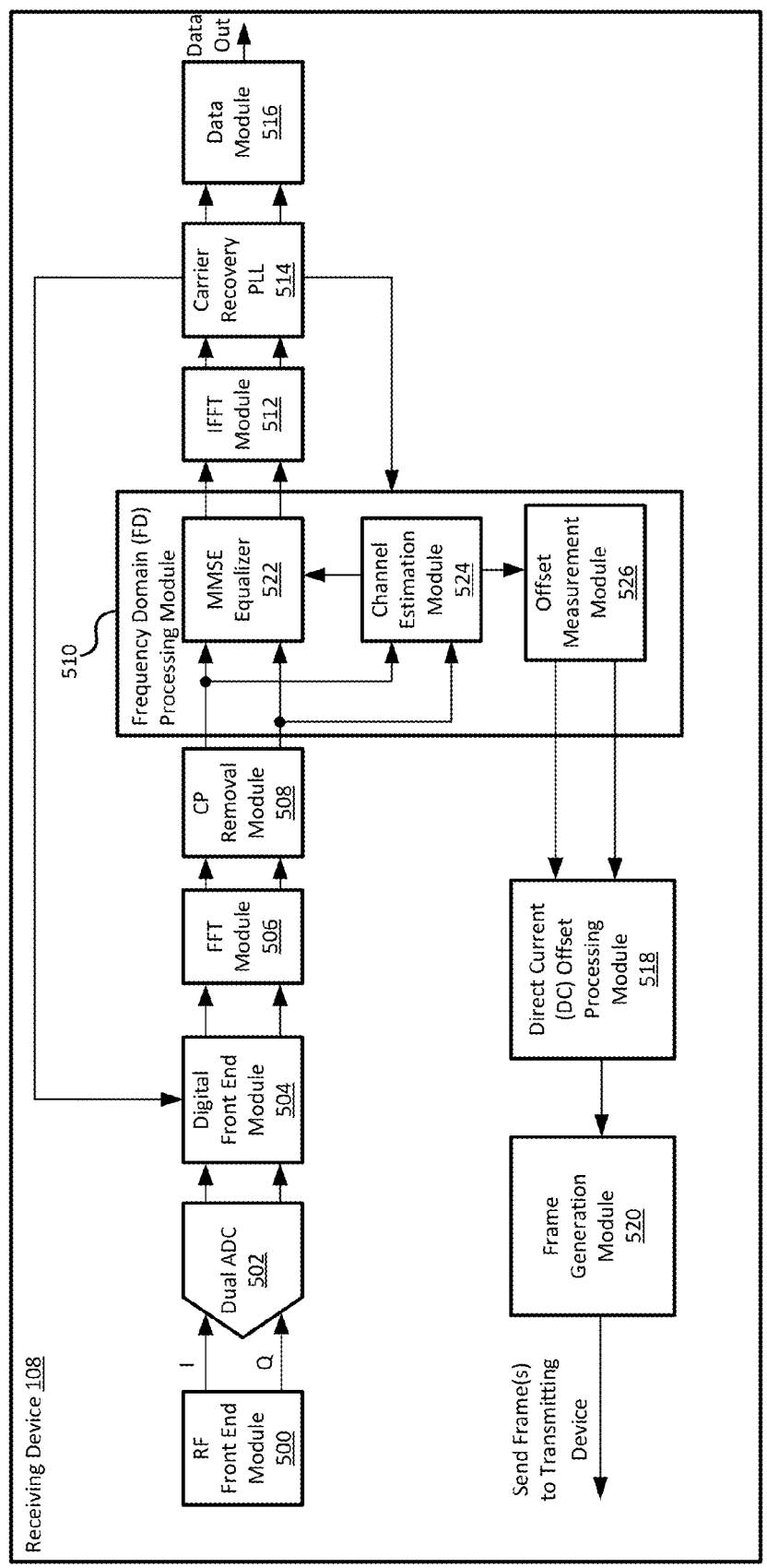
FIG. 5 is a block diagram of an example receiving device in accordance with some embodiments.

FIG. 5 is a block diagram of the receiving device 108 in accordance with some embodiments. In FIG. 5, the receiving device 108 comprises a radio frequency (RF) front end module 500, a dual analog-to-digital converter (ADC) 502, a digital front end module 504, a Fast Fourier Transform (FFT) module 506, a cyclic prefix (CP) removal module 508, a frequency domain (FD) processing module 510, an Inverse-Fast Fourier Transform (IFFT) module 512, a carrier recovery phase-lock loop (PLL) 514, a data module 516, a direct current (DC) offset processing module 518, and a frame generation module 520. The FD processing module 510 comprises a minimum mean squared error (MMSE) equalizer 522, a channel estimation module 524, and an offset measurement module 526. Those skilled in the art will appreciate that for some embodiments the components, functionality, or configuration of the receiving device 108 may differ from what is described or depicted with respect to FIG. 5.

The RF front end module 500 may be configured to receive a radio frequency (RF) signal from a transmitting device (e.g., the transmitting device 102), convert the RF signal into an analog in-phase (I) signal and an analog quadrature (Q) signal. The RF front end module 500 may comprise components suitable for performing heterodyne operations and IQ modulation. The RF signal received by the RF front end module may be transmitted from a transmitting device (e.g., the transmitting device 102) to the receiving device 108 over a bi-directional wireless channel between the transmitting device and the receiving device 108. The dual ADC 502 may receive the analog I and Q signals from the RF front end module 500 and convert the analog I and Q signals to corresponding digital I and Q signals. The digital front end module 504 may receive the digital I and Q signals and correct the digital I and Q signals for frequency error (e.g., reduce or eliminate carrier frequency offset in the I and Q signals) before the digital I and Q signals are provided to the FFT module 506. For some embodiments, the digital front end module 504 applies frequency offset corrections to the digital I and Q signals based on an average frequency error provided by the carrier recovery PLL 514.

The FFT module 506 may comprise a processor configured to perform Fast Fourier Transform (FFT) operations on the digital I and Q signals. By performing FFT operations on the digital I and Q signals, the FFT module 506 can convert the digital I and Q signals from the time domain to the frequency domain. Before the FFT I and Q signals are processed by the FD processing module 510, the CP removal module 508 may remove cyclic prefixes (CP) from the FFT I and Q signals.

The FD processing module 510 may comprises one or more components configured to perform signal-based operations in the frequency domain. To perform frequency domain processing, the FD processing module 510 includes the MMSE equalizer 522 and the channel estimation module 524, and the offset measurement module 526. In the FD processing module 510, the MMSE equalizer 522 may equalize the FFT I and Q signals using minimum mean squared error, and output the equalized I and Q signals to the IFFT module 512 for further processing. At or near the same time, the channel estimation module 524 of the FD processing module 510 may perform channel estimation based on any preambles carrier by the FFT I and Q signals. Based on the preamble, the channel estimation module 524 may obtain a direct current (DC) bin measurement for the FFT I and Q signals. The DC bin measurement may be represented by a complex value. To facilitate or otherwise assist the channel estimation module 524 in performing channel estimation, the channel estimation module may utilize phase offset correction as provided by the carrier recovery PLL 514.

The offset measurement module 526 may receive the DC bin measurement from the channel estimation module 524 and determine a direct current (DC) offset based on the DC bin measurement. Subsequently, the offset measurement module 526 may provide the DC offset to the DC offset processing module 518. The DC offset provided by the offset measurement module 526 may comprise an amplitude offset, an angular offset, or both. For some embodiments, the DC offset provided by the offset measurement module 526 is an average calculated using a plurality of DC bin measurements acquired for a plurality of preambles processed by the channel estimation module 524.

Based on the DC offset information provided by the offset measurement module 526, the DC offset processing module 518 may determine one or more direct current (DC) offset corrections to be applied at the transmitting device supplying the RF signal (e.g., the transmitting device 102) to reduce or eliminate the DC offset measured by the offset measurement module 526. The DC offset processing module 518 may provide the frame generation module 520 with information regarding the determined DC offset corrections, which the frame generation module 520 includes in one or more frames it generates for transmission to the transmitting device supplying the RF signal (e.g., the transmitting device 102). For some embodiments, the frame generation module 520 may construct frames such that one or more of the constructed frames include the DC offset correction information in the control channel portion of the frames. For some embodiments, the frame constructed by the frame generation module 520 is similar to the frame depicted and described with respect to FIG. 3. The frame generation module 520 may provide constructed frames to the transmitter or transceiver for conversion to a radio frequency (RF) that is subsequently transmitted to a transmitting device (e.g., the transmitting device 102). When transmitting the RF signal from the receiving device 108 to a transmitting device (e.g., the transmitting device 102), the transmitter or transceiver may utilize the same channel used to receive the original RF signal from the transmitting device (i.e., a bi-directional wireless channel).

Figure 6:
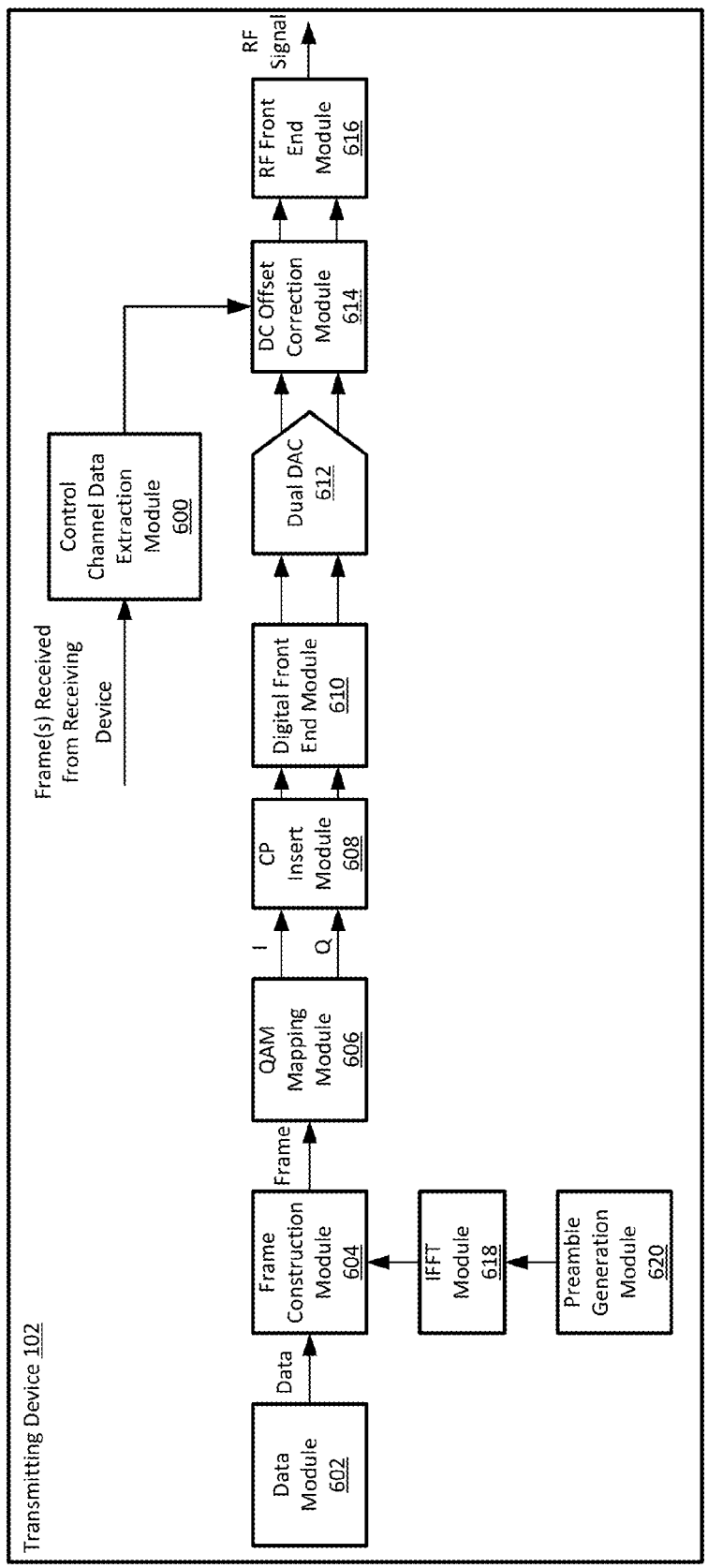
FIG. 6 is a block diagram of an example transmitting device in accordance with some embodiments.

For some embodiments, the frame generation module 520 may comprise one or more components illustrated and described with respect to FIG. 6, including a frame construction module 604, a quadrature amplitude module (QAM) mapping module 606, a cyclic prefix (CP) insert module 608, a digital front end module 610, and a dual digital-to-analog (DAC) converter 612. Such components may assist the receiving device 108 with generating frames for transmission to the transmitting device 102.

As described herein, the MMSE equalizer 522 may provide equalized I and Q signals to the IFFT module 512 for further processing. The IFFT module 512 may comprise a processor configured to perform Inverse Fast Fourier Transform (IFFT) operations on the equalized digital I and Q signals. By performing IFFT operations on the equalized I and Q signals, the IFFT module 512 can convert the equalized I and Q signals from the frequency domain to the time domain. The resulting IFFT I and Q signals may be provided to the carrier recovery PLL 514 for additional processing.

The carrier recovery PLL 514 may be configured to perform carrier recovery operations on the IFFT I and Q signals. As a result of the carrier recovery operations, the carrier recovery PLL 514 may provide frequency offset correction information and phase offset correction information to counter carrier errors present in the RF signal received from the transmitting device (e.g., the transmitting device 102) by the RF front end module 500. Subsequent to carrier recovery, the IFFT I and Q signals may be provided to the data module 516. The data module 516 may be configured to convert the IFFT I and Q signals to a digital data output, which may include computer readable data.

FIG. 6 is a block diagram of the transmitting device 102 in accordance with some embodiments. In FIG. 6, the transmitting device 102 comprises a control channel data extraction module 600, a data module 602, a frame construction module 604, a quadrature amplitude modulation (QAM) module 606, a cyclic prefix (CP) insert module, a digital front end module 610, a dual digital-to-analog (DAC) converter 612, a direct current (DC) offset correction module 614, a radio frequency (RF) front end module 616, an Inverse Fast Fourier Transform (IFFT) module 618, and a preamble generation module 620. Those skilled in the art will appreciate that for some embodiments the components, functionality, or configuration of the transmitting device 102 may differ from what is described or depicted with respect to FIG. 6.

The control channel data extraction module 600 may be configured to provide the DC offset correction module 614 with control channel data from frames received from the receiving device. As described herein, for some embodiments, direct current (DC) offset correction information may be transmitted from a receiving device (e.g., the receiving device 108) to the transmitting device 102 in the control channel of one or more frames transmitted from the receiving device to the transmitting device 102. The frames received from the receiving device (e.g., the receiving device 108) may be provided to the control channel data extraction module 600, which can then extract control channel data from the frames and provide the extracted control channel data to the DC offset correction module 614. The DC offset correction module 614, in turn, can obtain direct current (DC) offset correction information from the control channel data and apply corrective direct current (DC) biases to one or more signals at the transmitting device 102 according to the information.

The data module 602 may be configured to may be configured to receive digital data input, such as computer readable data, and provide the data for insertion into one or more frames constructed by the frame construction module 604. The preamble generation module 620 may be configured to generate preambles for frames constructed by the frame construction module 604. As the preamble generation module 620 may generate the preambles in the frequency domain, the preambles may be converted by the IFFT module 618 from frequency domain to the time domain before the preambles are inserted into frames constructed by the frame construction module 604.

The frame construction module 604 may be configured to construct frames for transmission to a receiving device (e.g., the receiving device 108). For some embodiments, control channel data may be provided for insertion into frames constructed by the frame construction module 604 for transmission from the transmitting device 102 to a receiving device (e.g., the receiving device 108). The control data provided for insertion into frames constructed by the frame construction module 604 may include a frame number, modulation profile, power adjustment, and the like. The frame construction module 604 may insert control channel data in control channel portions of constructed frames. Additionally, the frame construction module 604 may utilize the data provided by the data module 602 in data block portions of constructed frames, and may utilize preambles provided by the preamble generation module 620 in preamble portions of constructed frames. For some embodiments, the frame constructed by the frame construction module 604 is similar to the frame depicted and described with respect to FIG. 3.

The QAM module 606 may be configured to receive a frame constructed by the frame construction module 604 and generate a digital in-phase (I) signal and a digital quadrature (Q) signal based on QAM mapping of the frame. Subsequently, the CP insert module 608 may insert a cyclic prefix (CP) into the digital I and Q signals before the digital I and Q signals are processed by the digital front end module 610.

Eventually, the dual DAC 612 may convert the digital I and Q signals to corresponding analog I and Q signals. The DC offset correction module 614 may be configured to apply corrective direct current (DC) biases to one or more of the analog I and Q signals. For some embodiments, the DC offset correction module 614 applies corrective biases to one or more of the analog I and Q signals based on the direct current (DC) offset correction information provided by the control channel data extraction module 600. The DC offset correction module 614 may provide the resulting analog I and Q signals to the RF front end module 616 for subsequent conversion to an RF signal, which may be transmitted from the transmitting device 102 to a receiving device (e.g., the receiving device 108).

Figure 7:
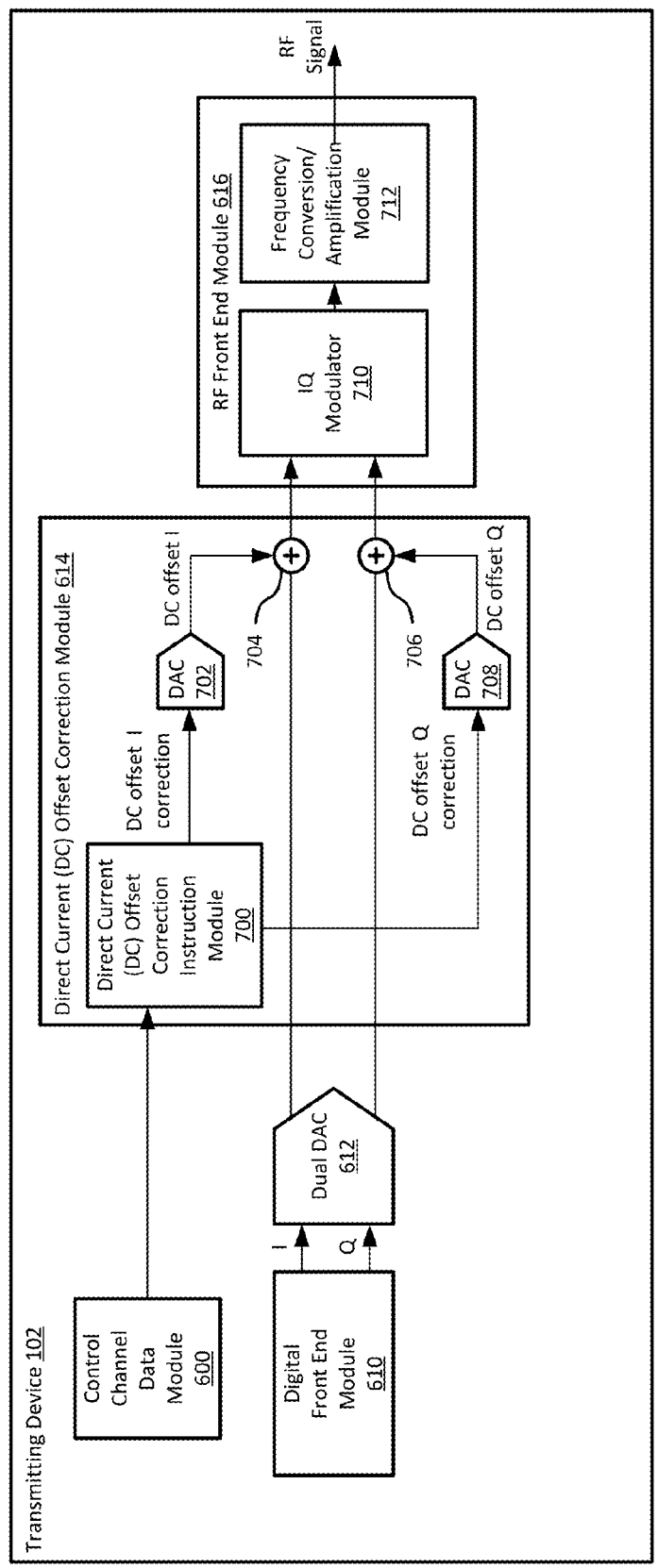
FIG. 7 is a block diagram of an example direct current (DC) offset correction module in a transmitting device in accordance with some embodiments.

FIG. 7 is a block diagram of the DC offset correction module 614 in the transmitting device 102 in accordance with some embodiments. In FIG. 7, the DC offset correction module 614 comprises a direct current (DC) offset correction instruction module 700, digital-to-analog converters (DACs) 702 and 708, and direct current (DC) bias addition components 704 and 706. As shown in FIG. 7, the DC offset correction module 614 is included as part of the transmitting device 102, and the DC offset correction module 614 is communicatively coupled between the dual DAC 612 and the RF front end module 616 of the transmitting device. In FIG. 7, the RF front end module 616 comprises an IQ modulator 710 and a frequency conversion/amplification module 712. Those skilled in the art will appreciate that for some embodiments the components, functionality, or configuration of the DC offset correction module 614, the RF front end module 616, or the transmitting device 102 may differ from what is described or depicted with respect to FIG. 7.

As shown in FIG. 7, the digital front end module 610 may provide the dual DAC 612 with a digital in-phase (I) signal and a digital quadrature (Q) signal, which the dual DAC 612 may convert to corresponding analog I and Q signals. The analog I and Q signals may be provided to the DC offset correction module 614 for direct current (DC) offset correction processing. To this end, the DC offset correction instruction module 700 may be configured to receive control channel data from the control channel data extraction module 600, which may extract control channel data from frames received by the transmitting device 102 from a receiving device (e.g., the receiving device 108). As described herein, for some embodiments, a receiving device (e.g., the receiving device 108) may transmit direct current (DC) offset correction information to the transmitting device 102 by including the DC offset correction information in the control channel portion of one or more frames the receiving device transmits to the transmitting device 102. Depending on the embodiment, the control channel data extraction module 600 may provide at least that portion of the control channel data that comprises the DC offset correction information.

Based on the DC offset correction information, the DC offset correction instruction module 700 may instruct the DAC 702 to apply a first corrective direct current (DC) bias to the analog I signal received by the DC offset correction module 614, the DC offset correction instruction module 700 may instruct the DAC 708 to apply a second corrective DC bias to the analog Q signal received by the DC offset correction module 614, or both. As described herein, the DC offset correction information may comprise DC offsets or relative directions in which corrective DC biases are respectively applied to the I and Q signals. Those skilled in the art will appreciate that corrective DC biases are applied to each of the I and Q signals independently.

When instructing each of the DAC 702 and the DAC 708 to apply corrective DC biases, the DC offset correction instruction module 700 may instruct each of the DACs using an independent digital signal. The DACs 702 and 708 may be configured to receive a digital signal from the DC offset correction instruction module 700 via a serial peripheral interface (SPI). Each of the DACs 702 and 708 may apply their respective corrective DC bias via one of the DC bias addition components 704 and 706.

Once processed by the DC offset correction module 614, the analog I and Q signals may be received by the IQ modulator 710 of the RF front end module 616. The IQ modulator 710 may be configured to modulate the analog I and Q signals to a signal (e.g., intermediate frequency signal), which the frequency conversion/amplification module 712 of the RF front end module 616 can convert to a radio frequency (RF) signal ready for transmission to a receiving device (e.g., the receiving device 108).

Figure 8:
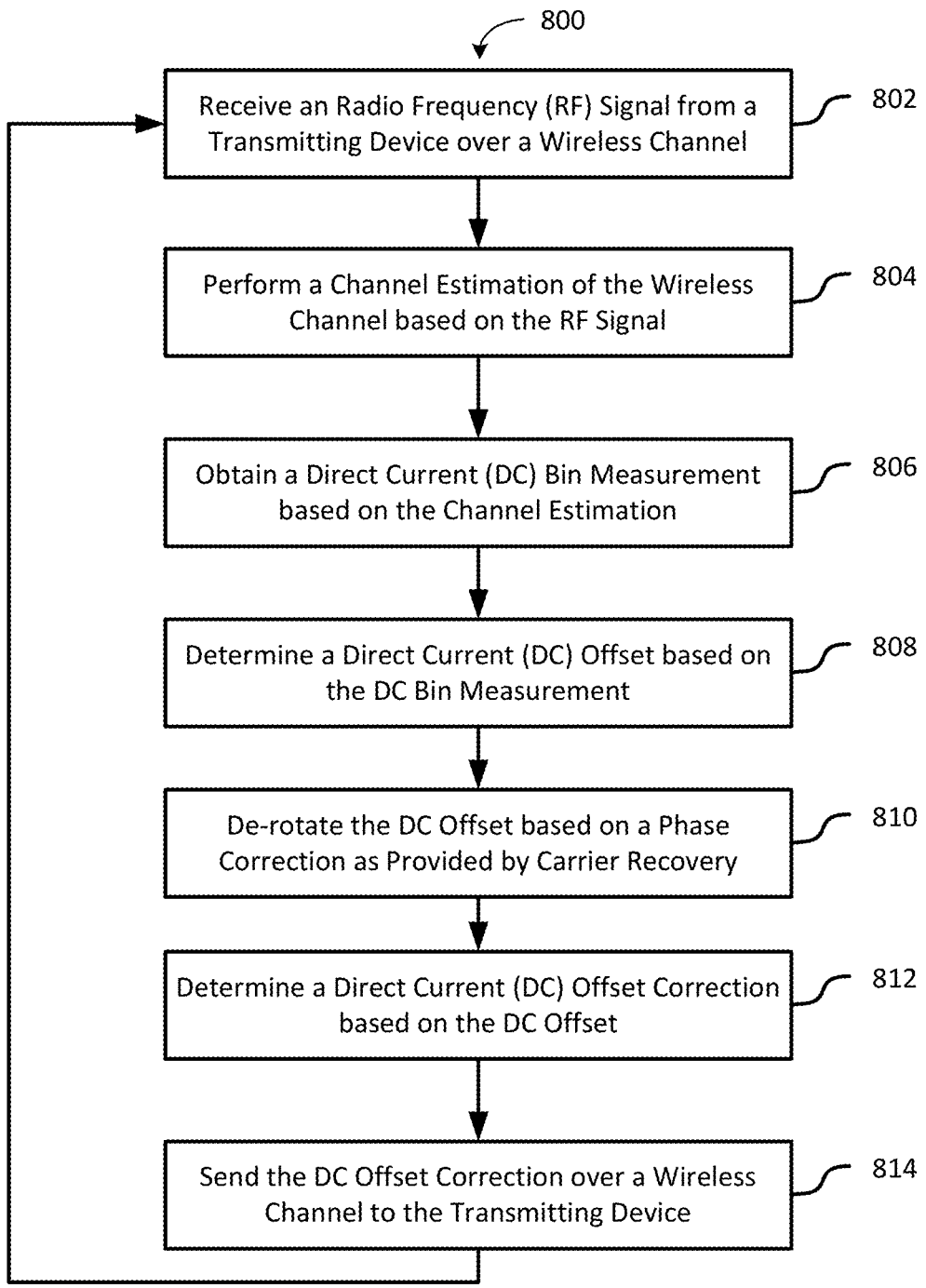
FIG. 8 is a flow diagram of an example method in accordance with some embodiments.

FIG. 8 is a flow diagram of an example method 800 in accordance with some embodiments. According to some embodiments, the method 800 is performed by a receiving device (e.g., the receiving device 108) to facilitate cancellation of one or more impairments in a signal received from a transmitting device (e.g., the transmitting device 102) via an over-the-air link, such as those impairments caused by local oscillator (LO) leakage present at the transmitting device. For some embodiments, the method 800 begins at step 802 with the receiving device 108 receiving a radio frequency (RF) signal from a transmitting device 102 over a wireless channel. The receiving device 108 may receive the RF signal through the RF module 210, which may be coupled to the antenna 106. The RF signal received from the transmitting device 102 include one or more frames, each frame comprising a preamble, a control channel, and one or more data blocks (or blocks). At step 804, the channel estimation module 212 performs a channel estimation of the wireless channel based on the received RF. signal. For some embodiments, the channel estimation module 212 performs channel estimation based on the preamble of one or more frames.

At step 806, the channel estimation module 212 obtains a direct current (DC) bin measurement based on performing channel estimation on the preamble of one or more frames. The channel estimation module 212 may provide the DC bin measurement, or an average of DC bin measurements obtained from multiple preambles, to the offset measurement module 214 for subsequent processing.

At step 808, the offset measurement module 214 determines a direct current (DC) offset based on the DC bin measurement (or average DC bin measurement) provided by the channel estimation module 212. As described herein, the DC bin measurement may be provided by the channel estimation module 212 as a complex value, and the DC offset determined by the offset measurement module 214 may comprise an angular offset, an amplitude offset, or both. Subsequently, at step 810, the offset measurement module 214 de-rotates the DC offset using a phase correction as provided by the carrier recovery PLL 514. The phase correction may be the phase offset at the time that the preamble used at step 804 was received by the receiving device 108.

At step 812, the DC offset processing module 216 determines a direct current (DC) offset correction based on the DC offset provided by the offset measurement module 214. For some embodiments, the DC offset processing module 216 generates information regarding one or more DC offset corrections to be applied to one or more signals at the transmitting device 102 as bias values. The information may comprise one or more direct current (DC) offset correction values that can be applied to one or more signals at the transmitting device 102 as bias values, or may comprise one or more relative directions in which a corrective DC bias (e.g., of a predetermined bias value) will be applied at the transmitting device 102. The DC offset processing module 216 may provide information regarding the DC offset corrections to the frame generation module 218 for transmission to the transmitting device 102.

At step 814, the receiving device 108 sends information, regarding the DC offset correction determined by the DC offset processing module 216, to the transmitting device 102 over a wireless channel. In some embodiments, the wireless channel is a bi-directional wireless channel, meaning that the wireless channel used to send DC offset correction information to the transmitting device 102 at step 814 is the same as the one providing the RF signal from the transmitting device 102 at step 802. To send the information, the receiving device 108 may utilize one or more of the RF module 210 and the frame generation module 218. The frame generation module 218 may generate one or more frames for transmission to the transmitting device 102, and may include the DC offset correction information in portions of those frames, including the control channel of the frame. The RF module 210 may receive the frames generated by the frame generation module 218 and transmit the frames to the transmitting device 102 through the antenna 106.

Though the steps of the method 800 may be depicted and described in a certain order, those skilled in the art will appreciate that the order in which the steps are performed may vary between different embodiments. Additionally, those skilled in the art will appreciate that the components described above with respect to the method 800 are merely examples of components that may be used with the method 800, and that other components may also be utilized in some embodiments.

Figure 9:
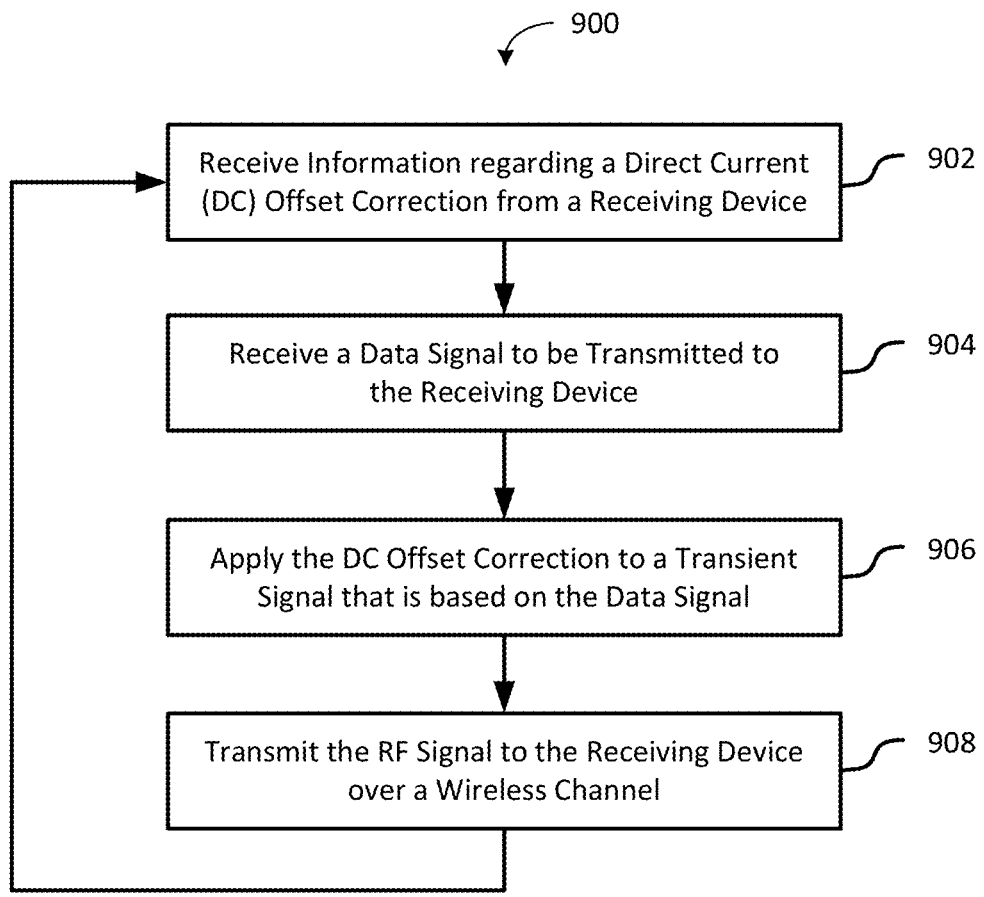
FIG. 9 is a flow diagram of an example method in accordance with some embodiments.

FIG. 9 is a flow diagram of an example method 900 in accordance with some embodiments. According to some embodiments, the method 900 is performed by a transmitting device (e.g., the transmitting device 102) to facilitate cancellation of one or more impairments in a signal received by a receiving device (e.g., the receiving device 108) from the transmitting device via an over-the-air link, such as those impairments caused by local oscillator (LO) leakage present at the transmitting device. For some embodiments, the method 900 begins at step 902 with the DC offset correction module 208 receiving information regarding a direct current (DC) offset correction from the receiving device 108. The transmitting device 102 may receive the DC offset correction information from the receiving device 108 over a wireless channel. For some embodiments, the information is provided to the DC offset correction module 208 by the frame inspection module 206, which receives frames from the receiving device 108 through the RF module 202 and inspects the frames for DC offset correction information sent from the receiving device 108. As described herein, in some embodiments, the DC offset correction information may be included in the control channel of a frame, or some other portion of the frame (e.g., preamble, data block).

At step 904, the data module 204 receives data by the frame inspection module 206. to be transmitted to the receiving device 108. The data may be computer-readable data generated at the transmitting device 102, or received by the transmitting device 102 (e.g., from the Internet, a LAN, or a WAN) through a network interface (e.g., Ethernet or WiFi). For some embodiments, the data is comprises digital information intended to be transmitted from the transmitting device 102 to the receiving device 108. The data module 204 may construct frames based on the data to be transmitted, and may provide the constructed frames to the RF module 202 for conversion to a radio frequency (RF) signal suitable for transmission to the receiving device 108 over a wireless channel.

As the RF module 202 converts the data from the data module 204 to a radio frequency (RF) signal, the RF module 202 may generate a transient signal (e.g., in-phase [I] and quadrature [Q] signals) based on the data. At step 906, the DC offset correction module 208 applies the direct current (DC) offset correction to the transient signal before the transient signal is converted to the RF signal. For some embodiments, the DC offset correction module 208 applies the DC offset correction in accordance with the DC offset correction information obtained via the frame inspection module 206 (e.g., according to bias relative directions contained provided by the DC offset correction information). Where the transient signal comprises I and Q signals, the DC offset correction information may cause the DC offset correction module 208 to independently apply biases to each of the I and Q signals.

At step 908, the RF module 202 transmits the RF signal to the receiving device 108 over a wireless channel. The wireless channel utilized may be the same as the wireless channel through which the transmitting device 102 received the direct current (DC) offset correction information from the receiving device 108 (e.g., via frames sent from the receiving device 108).

Though the steps of the method 900 may be depicted and described in a certain order, those skilled in the art will appreciate that the order in which the steps are performed may vary between different embodiments. Additionally, those skilled in the art will appreciate that the components described above with respect to the method 900 are merely examples of components that may be used with the method 900, and that other components may also be utilized in some embodiments.

Figure 10:
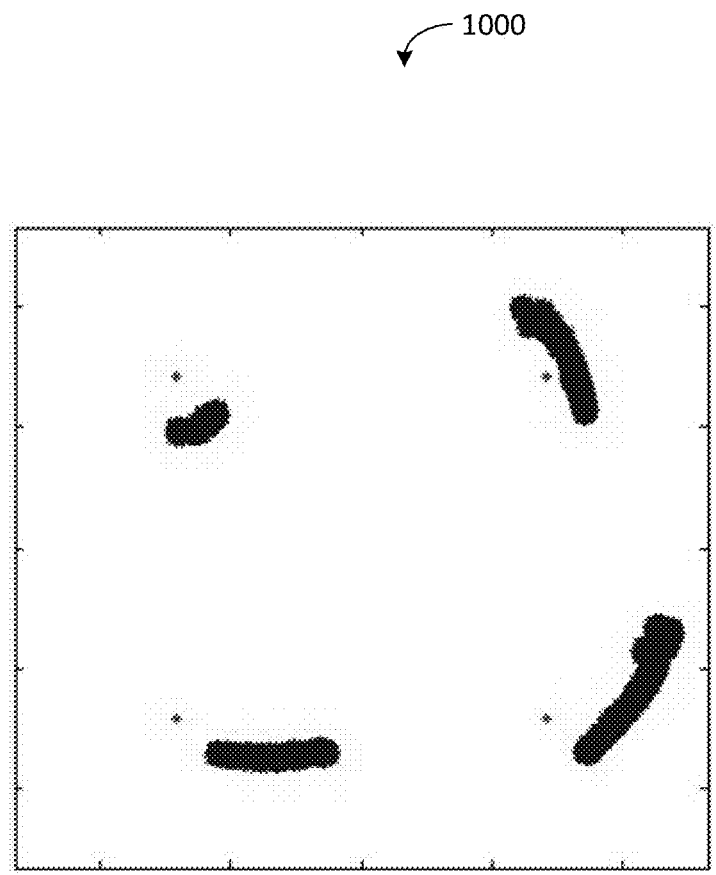
FIGS. 10-12 are graphs illustrating example constellations based demodulation of a signal.
Figure 11:
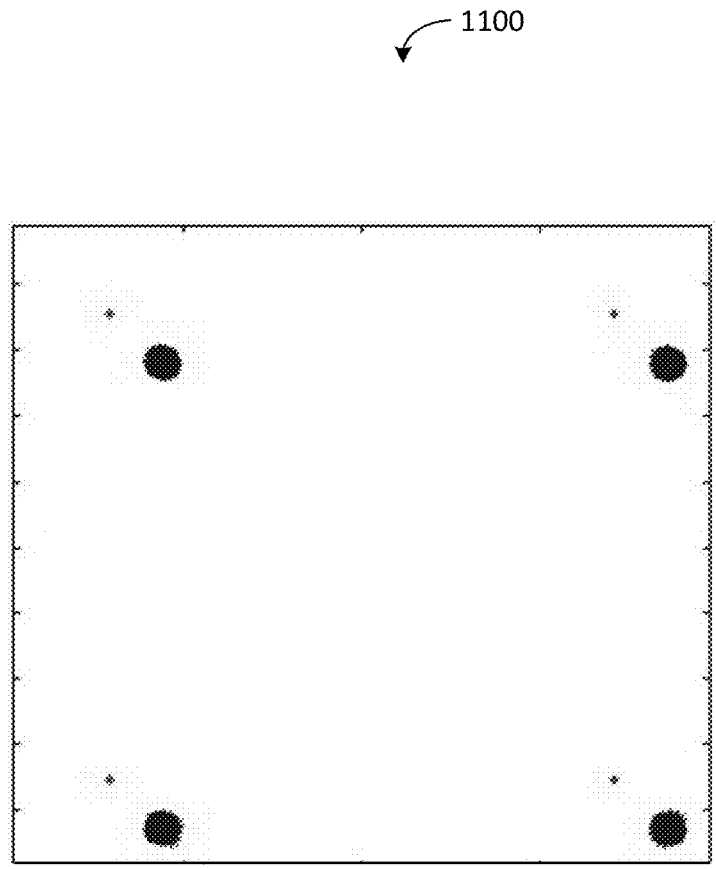
Figure 12:
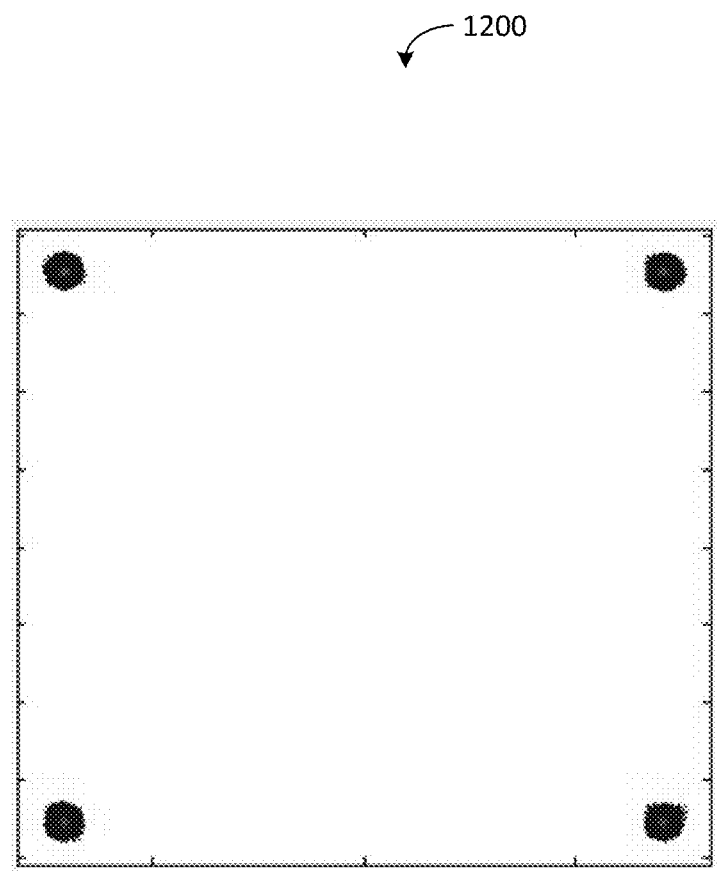

FIGS. 10-12 are graphs illustrating example constellations based demodulation of a signal. In FIGS. 10-12, the graphs illustrate example constellations based on demodulation (e.g., QPSK demodulation) of a transient signal that is based on a radio frequency (RF) signal received by a receiving device from a transmitting device. In particular, the graph 1000 of FIG. 10 illustrates a demodulated transient signal exhibiting direct current (DC) offset and carrier frequency offset, which may result from carrier errors and local oscillator (LO) leakage at the transmitting device. The graph 1100 of FIG. 11 illustrates a demodulated transient signal exhibiting DC offset but substantially lacking carrier frequency offset. As described herein, the DC offset may be the result of LO leakage at the transmitting device. In particular, the graph 1100 may illustrate the demodulated transient signal of the graph 1000 after the receiving device has been applied a frequency offset correction to the transient signal. The graph 1200 of FIG. 12 illustrates a demodulated transient signal that substantially lacks DC offset and carrier frequency offset. The graph 1200 may illustrate the demodulated transient signal of graph 1000 after the receiving device has been applied a frequency offset correction to the transient signal and after the transmitting device has applied DC offset corrections to a transient signal at the transmitting device.

Figure 13:
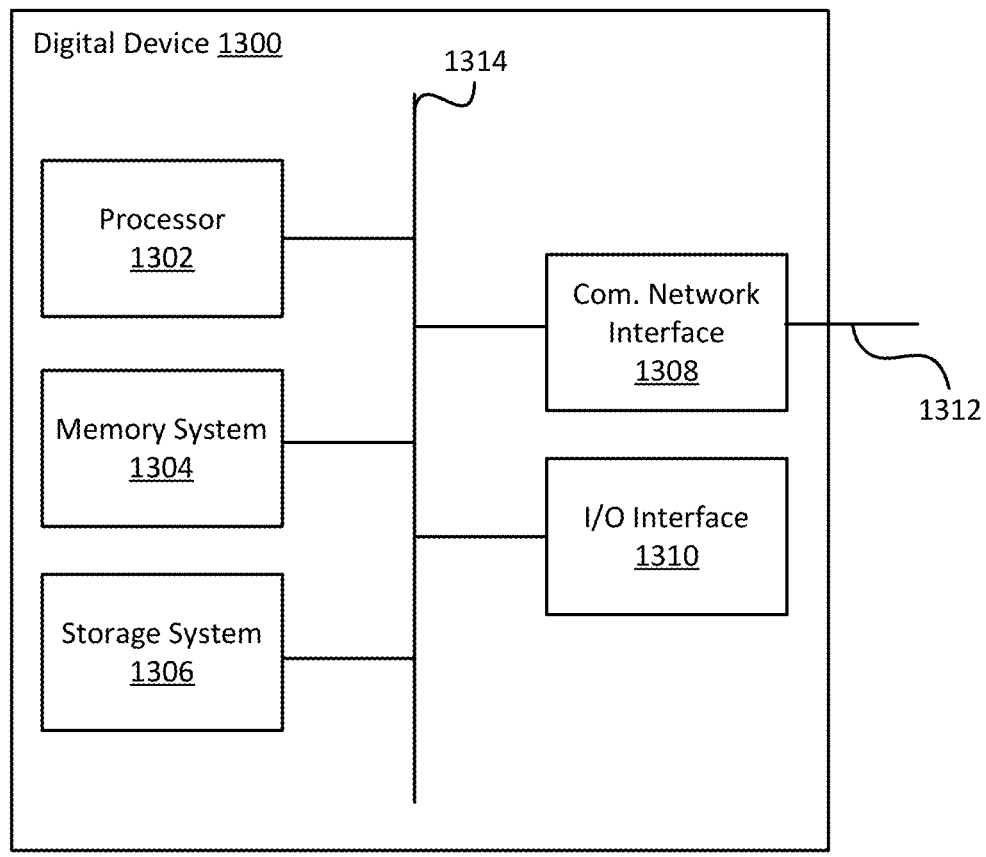
FIG. 13 depicts an example digital device according to some embodiments.

FIG. 13 depicts an example digital device 1300 according to some embodiments. The digital device 1300 comprises a processor 1302, a memory system 1304, a storage system 1306, a communication network interface 1308, an I/O interface 1310, and a display interface 1312 communicatively coupled to a bus 1314. The processor 1302 may be configured to execute executable instructions (e.g., programs). In some embodiments, the processor 1302 comprises circuitry or any processor capable of processing the executable instructions.

The memory system 1304 is any memory configured to store data. Some examples of the memory system 1304 are storage devices, such as RAM or ROM. The memory system 1304 may comprise the RAM cache. In various embodiments, data is stored within the memory system 1304. The data within the memory system 1304 may be cleared or ultimately transferred to the storage system 1306.

The storage system 1306 is any storage configured to retrieve and store data. Some examples of the storage system 1306 are flash drives, hard drives, optical drives, and/or magnetic tape. In some embodiments, the digital device 1300 includes a memory system 1304 in the form of RAM and a storage system 1306 in the form of flash data. Both the memory system 1304 and the storage system 1306 comprise computer readable media that may store instructions or programs that are executable by a computer processor including the processor 1302.

The communication network interface (com. network interface) 1308 may be coupled to a data network via the link 1316. The communication network interface 1308 may support communication over an Ethernet connection, a serial connection, a parallel connection, or an ATA connection, for example. The communication network interface 1308 may also support wireless communication (e.g., 802.11a/b/g/n, WiMAX). It will be apparent to those skilled in the art that the communication network interface 1308 may support many wired and wireless standards.

The optional input/output (I/O) interface 1310 is any device that receives input from the user and output data. The optional display interface 1312 is any device that may be configured to output graphics and data to a display. In one example, the display interface 1312 is a graphics adapter.

It will be appreciated by those skilled in the art that the hardware elements of the digital device 1300 are not limited to those depicted in FIG. 13. A digital device 1300 may comprise more or less hardware elements than those depicted. Further, hardware elements may share functionality and still be within various embodiments described herein. In one example, encoding and/or decoding may be performed by the processor 1302 and/or a co-processor located on a GPU.

One or more functions may be stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used.

We claim:

1. A method comprising:
   receiving a radio frequency (RF) signal from a transmitting device over a wireless channel;
   converting the RF signal to a transient signal;
   applying a frequency offset correction to the transient signal;
   performing a channel estimation of the wireless channel based on the RF signal, the performing the channel estimation of the wireless channel based on the RF signal comprising performing the channel estimation based on the transient signal;
   obtaining a direct current (DC) bin measurement based on the channel estimation; and
   determining a DC offset correction based on the DC bin measurement.

2. The method of claim 1, wherein the determining the DC offset correction comprises determining a DC offset based on the DC bin measurement.

3. The method of claim 2, wherein the DC offset comprises an angular offset or an amplitude offset obtained from a complex value representing the DC bin measurement.

4. The method of claim 1, further comprising sending DC offset correction information, regarding the DC offset correction, to the transmitting device.

5. The method of claim 4, wherein the sending the DC offset correction information to the transmitting device comprises including the DC offset correction information in a control channel of a frame to be transmitted to the transmitting device, the DC offset correction information describing the DC offset correction.

6. The method of claim 4, wherein the DC offset correction information comprises a relative direction in which a corrective DC bias should be applied to a transient signal at the transmitting device, the RF signal being generated at the transmitting device based on the transient signal.

7. The method of claim 6, wherein the transient signal comprises an in-phase (I) signal or a quadrature (Q) signal.

8. The method of claim 1, wherein the channel estimation is based on a preamble included in the RF signal.

9. The method of claim 1, wherein the transient signal comprises an in-phase (I) signal and a quadrature (Q) signal.

10. The method of claim 1, wherein the channel estimation uses a phase offset correction.

11. The method of claim 10, further comprising generating the phase offset correction by performing carrier recovery on the transient signal.

12. The method of claim 11, wherein the carrier recovery is performed in a time domain.

13. The method of claim 1, further comprising removing a cyclic prefix from the transient signal before the performing the channel estimation.

14. The method of claim 1, further comprising generating the frequency offset correction by performing carrier recovery on the transient signal.

15. The method of claim 1, further comprising performing minimum mean squared error (MMSE) equalization on the transient signal before performing carrier recovery on the transient signal.

16. The method of claim 15, wherein the MMSE equalization is performed in a frequency domain.

17. The method of claim 1, wherein the performing the channel estimation is performed in a frequency domain.

18. A method comprising:
   receiving direct current (DC) offset correction information from a receiving device over a first wireless channel, the DC offset correction information describing a DC offset correction, the DC offset correction information being based at least in part on a frequency offset correction, a channel estimation of a first transient signal based on a first radio frequency (RF) signal received at the receiving device over a second wireless channel, and a DC bin measurement of the first transient signal, the DC bin measurement based on the channel estimation;
   receiving data to be transmitted to the receiving device;
   applying the DC offset correction to a second transient signal that is based on the data;
   converting the second transient signal to a second RF signal; and transmitting the second RF signal to the receiving device over the second wireless channel.

19. The method of claim 18, wherein the DC offset correction described in the DC offset correction information is calculated at the receiving device based on a DC bin measurement of the first RF signal.

20. The method of claim 18, wherein the receiving the DC offset correction information from the receiving device over the first wireless channel comprises receiving a frame from the receiving device, the frame having a control channel that includes the DC offset correction information.

21. The method of claim 18, wherein the second transient signal comprises an in-phase (I) signal and a quadrature (Q) signal.

22. The method of claim 18, further comprising generating the second transient signal based on the data.

23. The method of claim 18, wherein the applying the DC offset correction to the second transient signal that is based on the data comprises applying a corrective DC bias to the second transient signal before the converting the second transient signal to the second RF signal.

24. The method of claim 23, wherein the DC offset correction information comprises a relative direction in which the corrective DC bias should be applied to the second transient signal.

25. A system comprising:
means for receiving a radio frequency (RF) signal from a transmitting device over a wireless channel;
means for converting the RF signal to a transient signal;
means for applying a frequency offset correction to the transient signal;
means for performing a channel estimation of the wireless channel based on the RF signal, the performing the channel estimation of the wireless channel based on the RF signal comprising performing the channel estimation based on the transient signal;
means for obtaining a direct current (DC) bin measurement based on the channel estimation; and
means for determining a DC offset correction based on the DC bin measurement.

26. A system comprising:
means for receiving direct current (DC) offset correction information from a receiving device over a first wireless channel, the DC offset correction information describing a DC offset correction, the DC offset correction information being based at least in part on a frequency offset correction, a channel estimation of a first transient signal based on a first radio frequency (RF) signal received at the receiving device over a second wireless channel, and a DC bin measurement of the first transient signal, the DC bin measurement based on the channel estimation;
means for receiving data to be transmitted to the receiving device;
means for applying the DC offset correction to a second transient signal that is based on the data;
means for converting the second transient signal to a second RF signal; and
means for transmitting the second RF signal to the receiving device over the second wireless channel.

* * * * *